United States Patent [19]
Horai et al.

[11] 3,844,804
[45] Oct. 29, 1974

[54] SILICATE FOAM STRUCTURES AND METHOD OF PREPARATION

[75] Inventors: John C. Horai; Calvin W. Sheeler, Jr., both of Hagerstown, Md.

[73] Assignee: GAF Corporation, New York, N.Y.

[22] Filed: Jan. 3, 1972

[21] Appl. No.: 215,166

[52] U.S. Cl. .................................. 106/75, 106/84
[51] Int. Cl. ............................................ C04b 35/16
[58] Field of Search ..................... 106/40 R, 75, 84

[56] References Cited
UNITED STATES PATENTS

| | | | |
|---|---|---|---|
| 2,481,391 | 9/1949 | Campbell | 106/84 |
| 3,095,312 | 6/1963 | Holmes | 106/40 R |
| 3,184,371 | 5/1963 | Seidl | 106/84 |
| 3,383,230 | 5/1968 | Streib et al. | 106/120 |
| 3,403,038 | 9/1968 | Abolins et al. | 106/63 |
| 3,450,547 | 6/1969 | Sams et al. | 106/40 R |
| 3,466,221 | 9/1969 | Sams et al. | 106/40 R |
| 3,475,188 | 10/1969 | Woodhouse et al. | 106/69 |
| 3,615,774 | 10/1971 | Criss | 106/65 |

*Primary Examiner*—James E. Poer
*Attorney, Agent, or Firm*—Walter C. Kehm; Samson B. Leavitt

[57] ABSTRACT

A liquid silicate reactant, such as phosphoric acid, is absorbed in an amorphous reactant carrier, preferably calcium containing, to form a dry premix composition that is blended with an aqueous alkali metal silicate to form a moldable silicate mix. This mix is heated in a mold at a temperature sufficient to cause the removal of water therefrom, with small water gas bubbles being formed within and throughout the mix to produce a lightweight multicellular foam structure. The reactant and calcium ions are slowly leached from the carrier for reaction with the silicate during the foaming process, improving the water-insolubility and firmness characteristics of the resulting foamed structure. The rate of leaching is sufficiently slow, however, so as not to cause premature and rapid reaction with the silicate tending to reduce expansion of the structure. As a result, a low density foamed structure having a density of from about 3 to about 15, preferably less than 10, lbs/ft$^3$ is obtained. The aqueous alkali metal silicate preferably comprises a combination of sodium silicate and potassium silicate, with the potassium silicate comprising from about 5 percent to about 10 percent by weight based on the total weight of alkali metal silicate employed.

29 Claims, No Drawings

SILICATE FOAM STRUCTURES AND METHOD OF PREPARATION

BACKGROUND OF THE INVENTION

1. Field of the Invention

This invention relates to inorganic silicate foams. More particularly, it relates to such foams having good dimensional stability and water insolubility characteristics together with a lightweight, fully foamed structure.

2. Description of the Prior Art

There has been a long and continued interest in expanded silicate foam materials. Such materials are non-combustible and fire resistant so as to find ready application in construction operations and related activities. It is interesting to note that the first U.S. patent for expanded silicates was issued in 1883 for the preparation of foam silicate structures for use as thermal insulation in fire-proof safes.

It is known that intumesced silicate structures can be produced by concentrating a silicate solution and then heating the solution so that the foam intumesces due to a rapid evaporation of water therefrom. In general, however, the resulting foamed mass is not sufficiently firm or water resistant for successful general application. Because of these inherent disadvantages in such foamed structures, it has been suggested that the silicate be reacted with mild acid, or with calcium, boron or zinc salts prior to and during the foaming operation. Silicate foams produced in this manner are found to possess improved water-insolubility and firmness. The rapid reaction of the silicate with the reactant, however, tends to reduce or inhibit expansion of the structure. As a result, the resulting foam is caused to be more dense than is generally desirable in such foamed structures.

It is an object of the invention, therefore, to provide improved foamed silicate structures.

It is another object to provide foamed silicate structures that are of low density but that possess good dimensional stability and high compressive strength.

It is another object to provide such lightweight foamed silicate structures that are non-hygroscopic and insoluble in water.

It is a further object of the invention to provide a process for the production of improved foamed silicate structures.

With these and other objects in mind, the invention is hereinafter described in detail, the novel features thereof being particularly pointed out in the appended claims.

SUMMARY OF THE INVENTION

The novel foamed silicate structure of the invention has good dimensional stability and water insolubility characteristics, together with a lightweight, low density nature. The desirable strength and water insolubility are achieved by reacting the silicate, during the foaming operation with a liquid silicate reactant, e.g., phosphoric acid. The reaction is controlled, however, so as to avoid inhibiting expansion of the structure. For this purpose, the liquid reactant is first mixed with an amorphous silica carrier, sufficient carrier being employed to absorb essentially all of the liquid reactant, thus forming a dry premix composition. This premix is then blended with aqueous alkali metal silicate to form a moldable silicate mix that is heated rapidly to foam the mix and form the desired lightweight cellular foam structure. The silicate employed is preferably a combination of sodium silicate and potassium silicate, with the latter comprising from about 5 percent to about 10 percent by weight based on the total weight of alkali metal silicate employed.

DETAILED DESCRIPTION OF THE INVENTION

In the practice of the present invention, the liquid silicate reactant (i.e., an agent reactive with the silicate to improve the water insolubility and firmness of the silicate upon foaming) employed to improve the properties of the foamed structure is slowly leached from an amorphous reactant carrier so as not to inhibit or prevent the desired foaming by a rapid premature reaction with the alkali metal silicate. For this purpose, the liquid silicate reactant is first mixed with a suitable carrier to form an essentially dry premix composition. In preparing the premix, it is essential that sufficient carrier material be employed to absorb the liquid silicate reactant and form an essentially dry premix composition. If free reactant were present, it would prematurely react with the silicate and the resulting mass would not intumesce properly to produce the desired lightweight structure. In accordance with the present invention, reactant ions are slowly leached from the carrier for reaction with the silicate during the foaming operation and an undesired premature reaction is avoided.

In the preparation of the dry premix composition, a lightweight, highly absorbent, amorphous silica carrier, preferably containing a minor amount of an alkaline earth metal salt, is mixed with a liquid silicate reactant, such as concentrated phosphoric acid. To assure that the acid is totally absorbed by the silica, about four parts of silica by weight are conveniently employed with from 1 to 2 parts by weight of the liquid reactant. The resulting dry premix composition is thereafter mixed with an aqueous alkali metal silicate to form a moldable silicate mix. It is also within the scope of the invention to mix a larger proportion of liquid reactant with the silica carrier, e.g., a weight ratio of 1:1, and dry the resultant mix to form the essentially dry premix of the invention.

The moldable silicate mix should be sufficiently plastic to be readily moldable. In an embodiment of the invention, about 10 parts by weight of the dry premix and about 85–95 parts by weight of an aqueous alkali metal silicate, or a mixture of such silicates, are mixed at ambient temperatures for a sufficient time to ensure adequate blending of the premix composition with the silicate. The resulting moldable mix is then placed in the desired mold, conveniently at about 0.2 grams of said moldable mix per cubic centimeter of mold volume.

The mold is covered with a perforated lid and is heated for a sufficient time at an adequate temperature to cause the water content of the mix to be rapidly removed therefrom. As the water is rapidly vaporized from the mix as steam, small water vapor gas bubbles are formed within and throughout the mix to produce a lightweight, multicellular foam structure. When the mold is heated in a muffle furnace, the air temperature of the furnace can be regulated to about 800°F, for a mold residence time of about 1½ hours. At the end of this heating period, the mold is cooled to room temperature. The intumesced foam structure is then removed from the mold and trimmed.

In the embodiment of the invention utilizing a muffle furnace as referred to above, the outer surface of the moldable silicate mix would be heated to about 800°F, with the core reaching a temperature of about 220°F during the indicated heating period. The present invention contemplates the use of furnace or oven air temperatures of from about 212°F to about 900°F, preferably from about 220°F to about 800°F, with a sufficient heating period to permit the desired vaporization of water from the body of the mix, i.e., from within and throughout the mix. When employing a muffle furnace or electric heating oven in which heat energy is applied to the surface of the mix, it will be appreciated that relatively high air temperatures will be required in order to achieve core temperatures of at least 212°F, preferably 220°F or higher. When a microwave oven or the like is employed, however, energy is imparted directly throughout the body of the mix so that air temperatures only slightly over 212°F, i.e., about 220°F to about 240°F, can readily be employed with heating periods of only a few minutes. It is within the scope of the present invention, therefore, to employ either type of heating operation to produce a lightweight foamed structure having the desired strength and other advantageous properties.

A variety of liquid silicate reactants, well known in the art, can be employed in the practice of the present invention. Illustrative reactants thus include concentrated phosphoric acid, e.g., 95.5 percent phosphoric acid, hydrochloric acid, aluminum chloride, ammonium chloride and aluminum sulfate solution, which must be in solution to be absorbed by the silica carrier.

The reactant carrier employed can be a lightweight, highly absorbent, amorphous silica readily available as a commercial product. As previously indicated, said amorphous silica preferably will contain a minor amount of an alkaline earth metal salt. The alkaline earth metal salt, commonly calcium oxide, carbonate or silicate will desirably be present in an amount of from about 5 percent to about 25 percent by weight based on the total weight of the commercial silica employed. Suitable silica carriers include Hi-Sil-404, which is a lightweight, highly amorphous silica containing 5 percent by weight calcium oxide, and Silene, which contains 18 percent by weight calcium oxide. Both of these amorphous silicas are manufactured by PPG Industries. Diatomaceous earth, clay, and talc can also be employed as the highly absorbent, amorphous reactant carrier material, although amorphous silica is generally preferred for use in the practice of the invention.

In general, commercially available sodium silicates having $Na_2O:SiO_2$ weight ratios of from about 1:1.5 to about 1:3.4, with total solids contents ranging from about 35 percent by weight to about 55 percent by weight, are suitable for use in the present invention. While the preferred alkali metal silicate is sodium silicate, it is highly preferred that a portion of the sodium silicate, such as from 5 to 10 percent by weight thereof, be replaced with potassium silicate. The foamed silicate structure resulting when such a combination of alkali metal silicates is employed is desirably non-hygroscopic and water-resistant.

The following examples are merely illustrative of the practice of the invention and are not intended as a limitation upon the scope of the invention as set forth in the appended claims.

EXAMPLE 1

A dry premix was prepared by mixing 8.0 grams of Hi-Sil-404 with 3.0 grams of 85.5 percent phosphoric acid. After thorough mixing, the silica carrier had completely absorbed the acid to produce a dry, freely flowable premix. 10 grams of this premix were mixed with liquid silicates for about 10 minutes at ambient temperature to achieve thorough blending and produce a moldable silicate mix. The liquid silicates employed were 85 grams of sodium silicate D having a weight ratio of $Na_2O$ to $SiO_2$ of 1:2.00 and 5 grams of potassium silicate having a $K_2O$ to $SiO_2$ weight ratio of 1:2.50. Both silicates were manufactured by Philadelphia Quartz Company. The moldable silicate mix was sufficiently fluid that it flattened out when put into a pile.

The foamed structure was produced by weighing 98 grams of the silicate mix into an iron mold having dimensions of 3 inches by 5 inches by 2 inches, equally 30 cubic inches or 492 cm³. The mold was covered with a perforated lid and placed in a muffle furnace maintained at an air temperature of 800°F. After heating for 1½ hours, the mold was removed and cooled to room temperature.

The intumesced foam structure had completely filled the mold. After being removed therefrom, it was precisely trimmed to exact dimensions of 3 inches by 5 inches by 2 inches and weighed. It had a density of 3.75 pounds per cubic foot and possessed a uniform cell structure. The compressive strength of the structure was 9.8 lbs per square inch. When exposed in a humidity chamber regulated to 90°F and 94 percent relative humidity, samples as above continued to be non-hygroscopic and maintained dimensional stability after 41 days. Equivalent foams formulated with 100 percent sodium silicate D, however, collapsed in said atmosphere after 7 days. After soaking in water at room temperature for 46 days, the silicate foam structure containing potassium silicate remained insoluble after 46 days, as compared to a 7 hour period of insolubility for samples made with 100 percent sodium silicate.

EXAMPLE 2

A dry premix was prepared by mixing 8.0 grams of Silene containing 18 percent CaO, said carrier manufactured by PPG Industries, with 3.0 grams of a 40 percent aqueous solution of ammonium chloride. After thorough mixing, the ammonium chloride solution was totally absorbed by the silica carrier to produce a dry, freely flowable premix. 10.0 grams of this premix was added to 85.0 grams of sodium silicate and 5.0 grams of potassium silicate. The sodium and potassium silicates, manufactured by Diamond Alkali Company, were S40, having a $Na_2O:SiO_2$ ratio of 1:3.25 and a total solids content of 37.8 percent and Kasil No. 1, having a $K_2O:SiO_2$ ratio of 1:2.50, respectively. The materials were mixed for twelve minutes to assure uniform blending of the moldable silicate mix. 98 grams of the mix were poured in the same mold as in Example 1, and the mold was again placed in a muffle furnace held at 800°F and kept there for 1½ hours. After cooling to room temperature, the structure silicate structure was removed and precisely trimmed. The density of the structure was found to be 4.7 pounds per cubic foot.

In a humidity chamber regulated to 90°F and 94 percent relative humidity, samples prepared as above remained dimensionally stable and non-hygroscopic after 35 days. Equivalent samples prepared with 100 percent sodium silicate D, however, collapsed after 6 days. In the water soak test, samples prepared with the indicated combination of silicates showed 41 days of insolubility, whereas those made with 100 percent sodium silicate D maintained insolubility for 7 hours.

EXAMPLE 3

A dry, fairly flowable premix was prepared with 8.0 grams of diatomaceous earth, and 3.0 grams of 85.5 percent phosphoric acid. This dry premix was blended with silicate to form a moldable silicate mix. For this purpose, 10.0 grams of dry premix was blended with 85.0 grams of sodium silicate, manufactured by the Philadelphia Quartz Company, and 5.0 grams of potassium silicate, Kasil No. 1 manufactured by the same company. Mixing was continued for 15 minutes after which 98 grams of the moldable mix were placed in the cast iron mold referred to above. After covering, the mold was heated in a muffle furnace maintained at 800°F for 1½ hours. After cooling to room temperature, the foam silicate was removed from the mold, trimmed to exact dimensions and weighed. The density was found to be 15.0 pounds per cubic foot.

As previously mentioned, it is within the scope of the invention to carry out the foaming operation in a muffle furnace, or the like, as in Examples 1–3, or by the use of high-frequency electronic heating. Such latter heating greatly shortens the time required for the foaming operation. By the use of high-frequency electronic ovens or furnaces, e.g., microwave ovens, heating periods of 10–15 minutes, or even less, have been found adequate. In addition, there is less distortion or irregularity of the foamed structure prepared by such high-frequency heating. In many applications, therefore, the product can be used directly as it is removed from the mold in which it is heated without the necessity of trimming to size. The foamed product still retains a glass-like surface or skin that contributes to its strength and moisture resistance. The following examples further illustrate the practice of the present invention with respect to the use of high-frequency heating during the foaming operation.

EXAMPLE 4

220 grams of the moldable silicate mix of Example 1 above were weighed into a Sheetrock mold having dimensions of 6 inches by 8 inches by ¾ inch. The filled mold, after covering with a perforated lid, was placed in a General Electric microwave oven of 2,450 megahertz oven set for 10 minutes automatic operation at about 220°F. After this heating period, the mold was removed from the oven and allowed to cool to room temperature. The foam silicate was removed from the mold and found to have a good regular shape of 6 inches by 8 inches by ¾ inch. The foam silicate also had a uniform cell structure and a hard glassy surface or skin. The density of the product was found to be 9.9 pounds per cubic foot. It had a compressive strength of 12.2 pounds per square inch.

EXAMPLE 5

A mixture of 1 part Hi-Sil and 1 part of 85.5 percent phosphoric acid were mixed and dried to form a dry premix composition. 3 parts by weight of this dry premix were mixed with 40 parts of sodium silicate solution, i.e., Silicate N of Philadelphia Quartz Company, and 40 parts of dehydrated sodium silicate to form a moldable silicate mix. 5 parts of zinc oxide and 5 parts of silicone, i.e., SC-3000 Silicone of General Electric Company, for added water repellency, were also incorporated in the mix. The ingredients were mixed for 5 minutes until a smooth creamy mixture free of lumps and undispersed materials was developed. The resulting mix was poured out onto commercially available release paper and inserted into microwave ovens. Ovens of 2450 Mhz and 915 Mhz were employed. With an oven input of 3 KW, 100gm pieces of the mix were foamed in about 3 minutes. The temperature of the foam did not exceed 240°F. The foam structure obtained is fine-celled and lightweight, having a density of from 9 to 12 lbs/ft$^3$ with desired firmness and strength.

The present invention, therefore, represents a significant advance in the art, permitting foamed silicate structures to be obtained with desired firmness and strength without adverse effect on the expansion of the structure during the foaming operation. Lightweight structures having a density of from 3 to 15 lbs/ft$^3$, generally less than 10 lbs/ft$^3$ are thereby achieved. Compression strengths, in addition, are entirely satisfactory for commercial applications, being generally above 9 psi. Structures having enhanced non-hygroscopic and water insolubility characteristics can likewise be achieved as indicated above. The use of the novel premix composition thus permits the desired characteristics of a foam silicate structure to be obtained in a highly desirable, lightweight silicate product.

Therefore, We claim:

1. A method for preparing a foamed silicate structure comprising:
    a. premixing a highly absorbent, amorphous lightweight reactant carrier with a liquid agent reactive with silicate to improve the water-insolubility and firmness of said silicate upon foaming thereof, said carrier and said agent being mixed in proportions such that said agent is essentially totally absorbed by the reactant carrier, resulting in an essentially dry premix composition;
    b. mixing said dry premix composition with an aqueous alkali metal silicate having a total solids content of from about 35 percent to about 55 percent by weight to form a moldable silicate mix;
    c. heating said moldable silicate mix in a mold at a temperature sufficient to cause the water content of the mix to be rapidly removed therefrom, small water vapor gas bubbles being formed within and throughout the mix to produce a lightweight, multicellular foam structure.

2. The process of claim 1 and including cooling the foamed silicate structure prior to removal thereof from said mold.

3. The process of claim 1 in which said alkali metal silicate comprises sodium silicate.

4. The process of claim 3 in which said alkali metal silicate comprises sodium silicate and potassium silicate.

5. The process of claim 4 in which said potassium silicate comprises from about 5 percent to about 10 percent by weight based on the total weight of alkali metal silicate employed, whereby the strength, dimensional stability, water insolubility and non-hygroscopic character of the foamed silicate structure are enhanced.

6. The process of claim 5 in which said amorphous carrier comprises silica containing from about 5 percent to about 25 percent by weight of an alkaline earth metal salt.

7. The process of claim 6 in which said salt is calcium oxide.

8. The process of claim 5 in which said liquid agent is taken from the group consisting of concentrated phosphoric acid, hydrochloric acid, aluminum chloride, ammonium chloride and aluminum sulfate solution.

9. The process of claim 1 in which the carrier comprises silica, and said silica and said liquid agent are mixed in a weight ratio of 4 parts silica and from 1 to 2 parts of said liquid reactant to form said dry premix composition.

10. The process of claim 8 in which the carrier comprises silica and said silica and said liquid agent are mixed in a weight ratio of 4 parts silica and from 1 to 2 parts of said liquid agent to form said dry premix composition.

11. The process of claim 10 in which said dry premix composition and said alkali metal silicates are blended in a weight ratio of about 10 parts of said dry premix to about 85 to about 95 parts of said silicates to form said moldable silicate mix.

12. The process of claim 8 in which said liquid agent comprises phosphoric acid.

13. The process of claim 11 in which said liquid agent comprises phosphoric acid.

14. The process of claim 13 in which said phosphoric acid comprises 85.5 percent phosphoric acid.

15. The process of claim 1 in which said moldable silicate mix is heated at an air temperature of from about 212°F to about 900°F for a period of time sufficient to permit water to be vaporized from the body of the mix, thus forming the desired foamed structure.

16. The process of claim 15 in which said moldable mix is heated by high-frequency electronic heating, said temperature not exceeding about 240°F, the time of heating not exceeding 15 minutes.

17. The process of claim 5 in which said moldable silicate mix is heated at an air temperature of from about 212°F to about 900°F for a period of time sufficient to permit water to be vaporized from the body of the mix, thus forming the desired foam structure.

18. The process of claim 17 in which said temperature is from about 220°F to about 800°F.

19. The process of claim 18 in which said liquid agent is taken from the group consisting of concentrated phosphoric acid, hydrochloric acid, aluminum chloride, ammonium chloride and aluminum sulfate solution.

20. The process of claim 19 in which said liquid agent comprises 85.5 percent phosphoric acid.

21. The process of claim 20 in which the carrier comprises silica and said silica and said liquid agent are mixed in the proportions of about 4 parts silica and from 1 to 2 parts phosphoric acid by weight to form said dry premix, said premix and alkali metal silicates being blended in a weight ratio of about 10 parts of said dry premix to about 85 to about 95 parts of said silicates to form said moldable silicate mix.

22. A moldable silicate mix composition comprising:

a. an aqueous alkali metal silicate having a total solids content of from about 35 percent to about 55 percent by weight; and b. a dry premix composition comprising a mixture of a highly absorbent, amorphous, lightweight carrier comprising amorphous silica containing from about 5 percent to about 25 percent by weight of an alkaline earth metal salt and a liquid agent reactive with silicate to improve the water insolubility and firmness of said silicate upon foaming thereof, said liquid agent being present in an amount such that said agent is essentially totally absorbed by the carrier.

23. The composition of claim 22 in which said alkali metal silicate comprises sodium silicate.

24. The composition of claim 23 in which said alkali metal silicate comprises sodium silicate and potassium silicate.

25. The composition of claim 24 in which said potassium silicate comprises from about 5 percent to about 10 percent by weight based on the total weight of alkali metal silicate employed, whereby the strength, dimensional stability, water insolubility and non-hygroscopic character of the foamed silicate structure are enhanced.

26. The composition of claim 25 in which said metal salt is calcium oxide.

27. The composition of claim 25 in which said liquid agent is taken from the group consisting of concentrated phosphoric acid, hydrochloric acid, aluminum chloride, ammonium chloride and aluminum sulfate solution.

28. The composition of claim 27 in which said amorphous silica carrier and said liquid agent are employed in a weight ratio of 4 parts silica and 1 to 2 parts of said liquid agent to form said dry premix and said dry premix and said alkali metal silicate are employed in a weight ratio of about 10 parts of said premix to about 85 to about 95 parts of said silicates.

29. The composition of claim 28 in which said liquid agent comprises phosphoric acid.

* * * * *